United States Patent [19]

Saito

[11] 4,345,284

[45] Aug. 17, 1982

[54] DEVICE FOR PREVENTING ELECTROSTATIC CHARGES ON A MAGNETIC RECORDING TAPE OF A TAPE CASSETTE

[75] Inventor: Shoichi Saito, Tokyo, Japan

[73] Assignee: Olympus Optical Co., Ltd., Tokyo, Japan

[21] Appl. No.: 145,365

[22] Filed: Apr. 30, 1980

[30] Foreign Application Priority Data

May 7, 1979 [JP] Japan .................. 54-60452[U]

[51] Int. Cl.$^3$ .......................................... G11B 23/08
[52] U.S. Cl. ................................................ 360/132
[58] Field of Search ................... 360/132; 361/212; 474/90

[56] References Cited

U.S. PATENT DOCUMENTS

| | | | |
|---|---|---|---|
| 4,096,538 | 6/1978 | Oishi | 360/132 |
| 4,191,984 | 3/1980 | Tsukidate et al. | 360/132 |
| 4,285,020 | 8/1981 | Sato | 360/132 |

FOREIGN PATENT DOCUMENTS

| | | | |
|---|---|---|---|
| 54-143123 | 11/1979 | Japan | 360/132 |
| 55-42389 | 3/1980 | Japan | 360/132 |

OTHER PUBLICATIONS

Information Terminals-publication-Feb. 1972.
Electronic Products Magazine, p. 149—May 1970.

*Primary Examiner*—Stuart N. Hecker
*Attorney, Agent, or Firm*—Frishauf, Holtz, Goodman & Woodward

[57] ABSTRACT

A tape cassette for mounting in a magnetic recording tape running apparatus having at least one electroconductive member and at least one reel shaft for causing running of a magnetic recording tape, comprises a magnetic recording tape having an electroconductive nature and being accumulated with electrostatic charges and a housing made of an electroconductive material for storing the magnetic recording tape. The housing includes an element having an electroconductivity which is contacted with the magnetic recording tape and transfers electrostatic charges from the magnetic recording tape to the housing. The housing is contacted with the electroconductive member of the magnetic recording tape running apparatus when the housing is mounted in the magnetic recording tape running apparatus.

9 Claims, 6 Drawing Figures

DEVICE FOR PREVENTING ELECTROSTATIC CHARGES ON A MAGNETIC RECORDING TAPE OF A TAPE CASSETTE

BACKGROUND OF THE INVENTION

This invention relates to a device for preventing electrostatic charges on a magnetic recording tape stored in a housing of a tape cassette and having an electroconductivity.

It is advantageous to store, in a housing of a tape cassette, as long a length of tape as possible that can be wound on a reel hub in a given capacity of space defined by the housing, because it is possible to extend the time for permitting a magnetic signal to be recorded on the magnetic recording tape. Further, where the same magnetic signal recording time is set, the quality of the magnetic signal to be recorded on the magnetic recording tape can be improved, because if more tape is provided it is possible to quicken the running speed of the magnetic recording tape. In order to obtain the above-mentioned advantages, a method is recently practiced a magnetic layer is formed on the tape by an evaporation process to permit obtaining a thinner magnetic recording tape.

Where a tape cassette is mounted on a magnetic recording tape running apparatus and the magnetic tape is run at an unfixed speed, the magnetic recording tape is slidably contacted with a magnetic recording tape guide member in a housing of a tape cassette, causing static electricity to be produced which accumulates on the magnetic layer of the tape. This phenomenon occurs irrespective of whether use is made of a magnetic recording tape having a magnetic layer of relatively good electroconductivity as formed through an evaporation process or a magnetic recording tape having a magnetic layer of no electroconductivity as formed by using minute magnetic materials and paste. The accumulation of electrostatic charges onto the magnetic layer also occurs in a case where the magnetic recording tape is slidably contacted with the housing during the transport of the tape cassette which is detached from the magnetic recording tape running apparatus.

When during the running of the magnetic recording tape of the tape cassette on the magnetic recording tape running apparatus the magnetic layer of the magnetic recording tape is contacted with a member of relatively good electroconductivity, for example, a tape guide made of a material such as aluminum or iron or stainless steel and fixed to or arranged in proximity to a shield case of a magnetic head, the electrostatic charge accumulated on the magnetic layer is transferred to the tape guide. If at this time an occasionally interrupted contact between the tape guide and the magnetic layer is effected with the lapse of time, a discharge phenomenon occurs. Where the magnetic layer is formed of minute magnetic materials and paste, an amount of electrostatic charge accumulated on the magnetic layer is relatively small and an amount of static electricity discharged upon one contact with the tape guide is also small. In consequence, even if the above-mentioned discharge is reproduced by the magnetic head as noise, the magnitude of the noise can be substantially neglected during recording and reproducing. Where the magnetic layer is formed by an evaporation process and has a relatively good electroconductivity, a still greater amount of static electricity is accumulated in the magnetic layer than that of the former magnetic layer and a much greater amount of static electricity is discharged upon one contact with the tape guide. Where such a discharge is reproduced by the magnetic head as noise, the magnitude of the noise cannot be disregarded during recording and reproducing.

SUMMARY OF THE INVENTION

It is accordingly the object of this invention to provide a device for preventing electrostatic charges on a magnetic recording tape stored in a housing of a tape cassette and having an electroconductive property whereby noises resulting from an electrostatic discharge are prevented.

DETAILED DESCRIPTION OF THE PREFERRED EMBODIMENT

Figure 1:
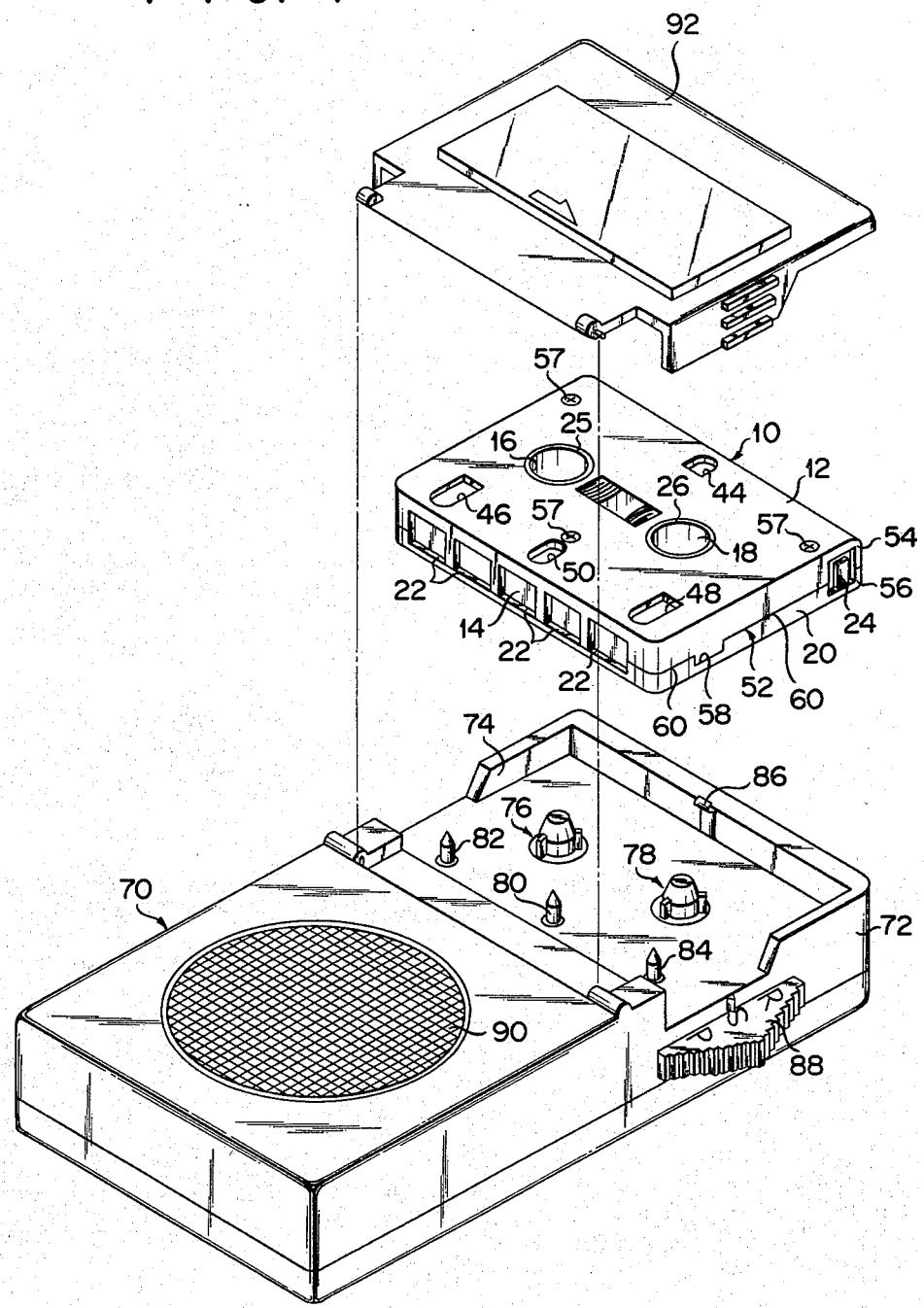
FIG. 1 is a perspective view showing a tape cassette according to an embodiment of this invention and a magnetic recording tape running apparatus in which the tape cassette is used.
Figure 2:
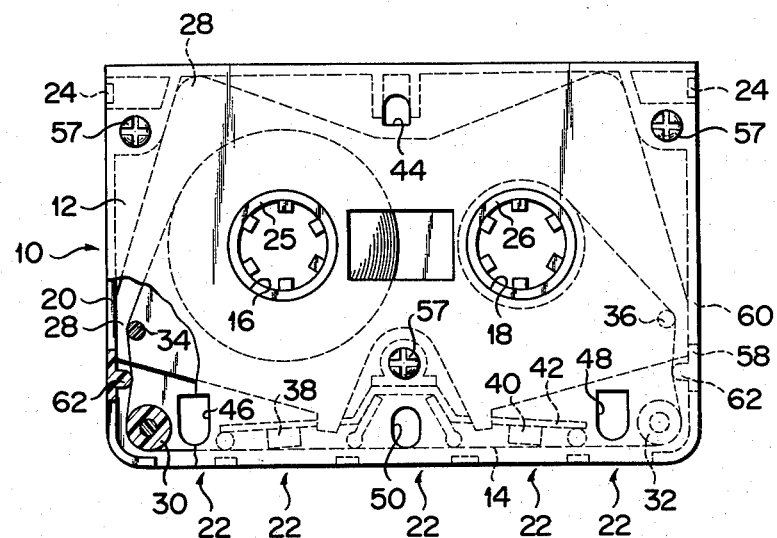
FIG. 2 is a plan view, partly broken away, showing a housing of the tape cassette of FIG. 1.

In FIG. 1 is shown a tape cassette 10 according to one embodiment of this invention. As shown in FIG. 1 and FIG. 2, the tape cassette 10 has a housing 12 and a magnetic recording tape 14 stored in the housing 12. In the embodiment, the housing 12 is made of a material obtained by adding powdered or fibrous graphite to polystyrene and has an electroconductive property. In this embodiment, the magnetic recording tape 14 has a plastic base and a magnetic layer formed by evaporating minute magnetic materials on one of two faces extending in the lateral and longitudinal directions of the base. Since the magnetic layer has no paste, it has electroconductive property. The housing 12 has two mutually opposite, parallel panels having a pair of steel shaft insertion holes 16, 18 and a peripheral wall 20 secured to the two panels along the edges of the panels. The peripheral wall 20 has a front wall portion at which a plurality of pinch rollers and magnetic head insertion windows 22 are provided, right and left wall portions having at the rear end areas removable lugs 24 for preventing accidental erasure, and a rear wall portion opposite to the front wall portion. A pair of reel hubs 25, 26 are held in the holes 16, 18 of the panels of the housing such that they can be rotated. The ends of the magnetic recording tape 14 are fixed to the reel hubs 25 and 26, respectively. As shown in more detail in FIG. 2, the magnetic recording tape 14 is wound around the pair of the reel hubs 25, 26.

As shown in more detail in FIG. 2, a graphite-bearing liner sheet 28 is bonded to the inner surfaces of the panels of the housing respectively and has two effects of an electroconductivity and lubricity. The liner sheet 28 is slidably contacted with the longitudinal edges of the magnetic recording tape 14 on the pair of reel hubs 25, 26.

As shown in more detail in FIG. 2, a pair of rotatable guide rollers 30, 32 are provided at the front corners of the inner surface of one of the panels of the housing 12. A pair of guide pins 34, 36 are disposed right behind the guide rollers 30, 32 on the inner surface of said one panel such that they are spaced away from the guide rollers. The guide rollers 30, 32 and guide pins 34, 36 are contacted with the other (base side face) of two faces extending in the lateral and longitudinal directions of the tape at the middle portion of the tape extending from one reel hub 25 toward the other reel hub 26. The guide rollers 30, 32 and guide pins 34, 36 serve to guide the magnetic recording tape running between the reel hubs 25 and 26. That is, when the magnetic recording tape is run from one reel hub 25 toward the other reel hub 26, it is guided first by the guide pin 34 and guide roller 30, as shown in more detail in FIG. 2, to permit it to be moved along the inner surface of the left wall portion of the peripheral wall 20 of the housing. Then, the tape is guided by the guide roller 30 and guide roller 32 to permit it to be moved along the inner surface of the front wall portion of the peripheral wall 20. Then, the tape is guided by the guide roller 32 and guide pin 36, causing it to be moved along the inner surface of the right wall portion of the peripheral wall 20 and reaching the other reel hub 26. A leaf spring 42 holding a pair of pads 38, 40 is stored in the housing 12. The pads 38, 40 are contacted, between the guide rollers 30 and 32, with the base side face of the two faces of the tape.

As shown in FIGS. 1 and 2 a first elongated hole 44 for inserting a cassette position setting pin is formed on those middle portions of the two panels of the housing which are located near to the rear wall portion of the housing. As shown in FIGS. 1 and 2, second and third elongated holes 46, 48 for inserting cassette position setting pins are formed in those portions of the two panels of the housing which are located near to the right and left sides of the front wall portion of the housing. As shown in FIGS. 1 and 2, a fourth elongated hole 50 for inserting a capstan is formed in those middle portions of the two panels of the housing which are located near to the front wall portion of the housing.

Figure 3:
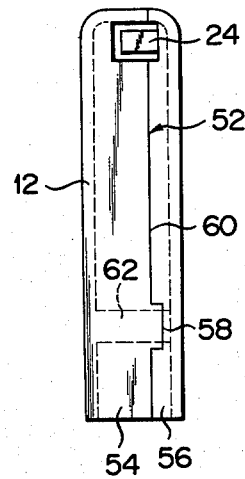
FIG. 3 is a right side view showing the tape cassette of FIG. 2.

The housing 12 of the tape cassette as explained above has the same outer shape and dimension as the well known microcassette. In this embodiment, as shown in FIGS. 1 and 3 mating surfaces 52 of the peripheral wall 20 of the housing are abutted against each other over the entire peripheral wall of the housing. The housing 12 can be divided by the mating surfaces 52 into an upper cassette half 54 and a lower cassette half 56. However, the upper and lower cassette halves 54 and 56 are normally secured by screws 57 to each other. Each one of the mating surfaces 52 includes two first portions 58 and a second portion 60. As shown in FIG. 2, the first portions 58 of the mating surfaces are located one at a position between the guide pin 34 and the guide roller 30 and one at a position between the guide pin 36 and the guide roller 32. The first portions 58 of the mating surfaces are also located within a range corresponding to the width of one face of the magnetic recording tape as viewed in a direction traversing the direction in which the mating surfaces extend, and at a position corresponding to substantially one third of the width of the magnetic recording tape 14 as measured from that longitudinal edge of the magnetic tape which is located at the panel side of the lower cassette half.

The second portions 60 of the mating surfaces are located at a position nearer to the panel of the upper cassette half than the first portions 58 of the mating surfaces as measured in a direction perpendicular to that in which the mating surfaces extend. As shown in FIG. 3 electroconductive members 62 each having an elongated base portion extending from one panel to the other panel of the tape cassette are provided on the inner surface of the upper cassette half 54 such that they are located in the positions corresponding to the first portions 58 of the mating surfaces. The elongated base portions of the members 62 have such a length as to reach the inner surface of the panel of the lower cassette half from the inner surface of the panel of the upper cassette half 54. The elongated base portion of the member 62 has a width (i.e. a length as measured in a direction perpendicular to the longitudinal direction of the elongated base portion of the member 62) smaller than the length of the first portions 58 of the mating surfaces. The member 62 is made of a material the same as that of the housing 12 and the elongated base portions of the members 62 are secured to the inner surface of the panel of the upper cassette half 54 because both the members 62 and the upper cassette half 54 are formed simultaneously by a molding process. The member 62 has a ridge projecting in a direction perpendicular to the inner surface of the peripheral wall 20 and extending parallel with the inner surface of the peripheral wall 20 along the elongated base portion. The ridges of the members 62 are contacted with the magnetic layer-bearing face of the magnetic recording tape in a position located one between the guide pin 34 and the guide roller 30 and one between the guide pin 36 and the guide roller 32.

A method for assembling the cassette tape 10 according to the embodiment of this invention will be explained below by referring to FIGS. 4 and 5.

Figure 4:
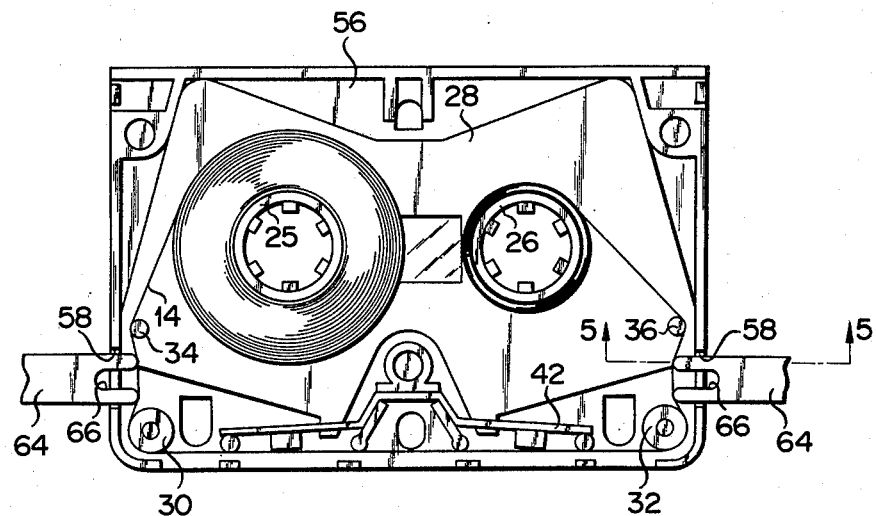
FIG. 4 is a plan view showing the portion of an assembling step of the tape cassette of FIG. 2 with its upper cassette half removed.

First, the pair of guide rollers 30, 32, leaf spring 42 and liner sheet 28 are located in predetermined positions on the lower cassette half 56, as shown in FIG. 4. Then, the pair of reel hubs 25, 26 having the ends of a magnetic recording tape fixed thereto is fitted into the pair of holes 16, 18 of the lower cassette half 56 as shown in FIG. 4. An intermediate portion of the tape extending from one reel hub 25 to the other reel hub 26 is passed between the guide pin 34 and the guide roller 30, between the guide rollers 30, 32, and between the guide roller 32 and the guide pin 36.

Figure 5:
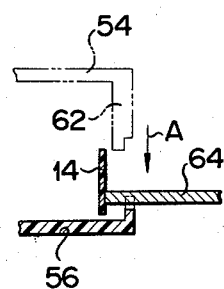
FIG. 5 is a cross-sectional view taken along line 5—5 in FIG. 4.

Then, tape shifters 64 (assembling jigs) are inserted parallel to the inner surface of the panel of the lower cassette half 56 one along the upper end of the first portion 58 of the mating surface of the right side wall and one along the upper end of the first portion 58 of the mating surface of the left side wall of the lower cassette half, as shown in FIGS. 4 and 5. The tape shifter 64 has a width substantially the same as the length of the first portion 58 of the mating surface 52. The tape shifter 64 has a thickness substantially equal to a distance of a difference between the first portion 58 and the second portion 60 of the mating surface or smaller than said distance, as viewed in a direction perpendicular to that in which the panels of the upper and lower cassette halves. As shown in FIG. 4 the forward end of the tape shifter 64 presses a portion of the magnetic recording tape 14 located between the guide roller 30 and the guide pin 34 and between the guide roller 32 and the guide pin 36 in a direction away from the inner surface of the peripheral wall 20 of the housing 12.

The forward end portion of the tape shifter 64 is bifurcated to provide a slit 66 having a width somewhat greater than the width of the member 62 as measured in a direction perpendicular to the longitudinal direction of the member 62. When the forward end of the tape shifter 64 is contacted with the magnetic recording tape 14 slit 66 extends in a direction traversing the peripheral wall 20 of the lower cassette half 56. At this time, the backward end of the slit 66 is situated outside the peripheral wall 20.

As indicated by an arrow A in FIG. 5 the upper cassette half 54 is moved vertically down toward the lower cassette half 56. When at this time the lower end of the ridge of the member 62 comes to the position where it confronts the magnetic layer-bearing face of the magnetic recording tape the tape shifter 64 is removed away from the lower cassette half through the first portion 58 of the mating surface 52 of the lower cassette half. When the upper cassette half 54 is further moved down toward the lower cassette half, the mating surface 52 of the upper cassette half 54 is contacted with the mating surface 52 of the lower cassette half 56, providing a tape cassette as an integral unit. Then, the upper cassette half 54 is secured by screws 57 to the lower cassette half, thereby completing an assembly of the tape cassette 10.

FIG. 1 shows a magnetic recording tape running apparatus 70 using the tape cassette 10 according to one embodiment of this invention. In this embodiment the magnetic recording tape running apparatus 70 is a tape recorder.

As shown in FIG. 1 a tape cassette mounting recess 74 is formed in the upper surface of a housing 72 of the magnetic recording tape running apparatus. A pair of reel shafts 76, 78 and a capstan 80 are projected in the recess 74 of the housing 72 of the apparatus. A pair of tape cassette position setting pins 82, 84 are also projected in the recess 74. A leaf spring 86 is arranged in the recess 74. The leaf spring 86 and the pins 82, 84 are electroconductive members made of an electroconductive material such as iron or aluminum or stainless steel and are secured to a chassis (not shown) received in the housing 72 and made of an electroconductive material such as steel or aluminum. Thus, elements 82, 84 and 86 are "elements having an electroconductivity." A speaker 90 and a mode selection switch 88 is provided on the surface of the housing of the apparatus and a speaker 90 is provided in the housing of the apparatus. The mode selection switch 88 has a record mode position marked as a symbol R, a stop mode position marked as a symbol S and a play mode position marked as a symbol P. The recess 74 of the housing of the apparatus is adapted to be covered by a cover 92. The cover 92 prevents the invasion of dust into the recess 74 of the housing of the apparatus as well as an injury of the tape cassette by an external force when the tape cassette is mounted in the recess 74 of the apparatus housing.

Figure 6:
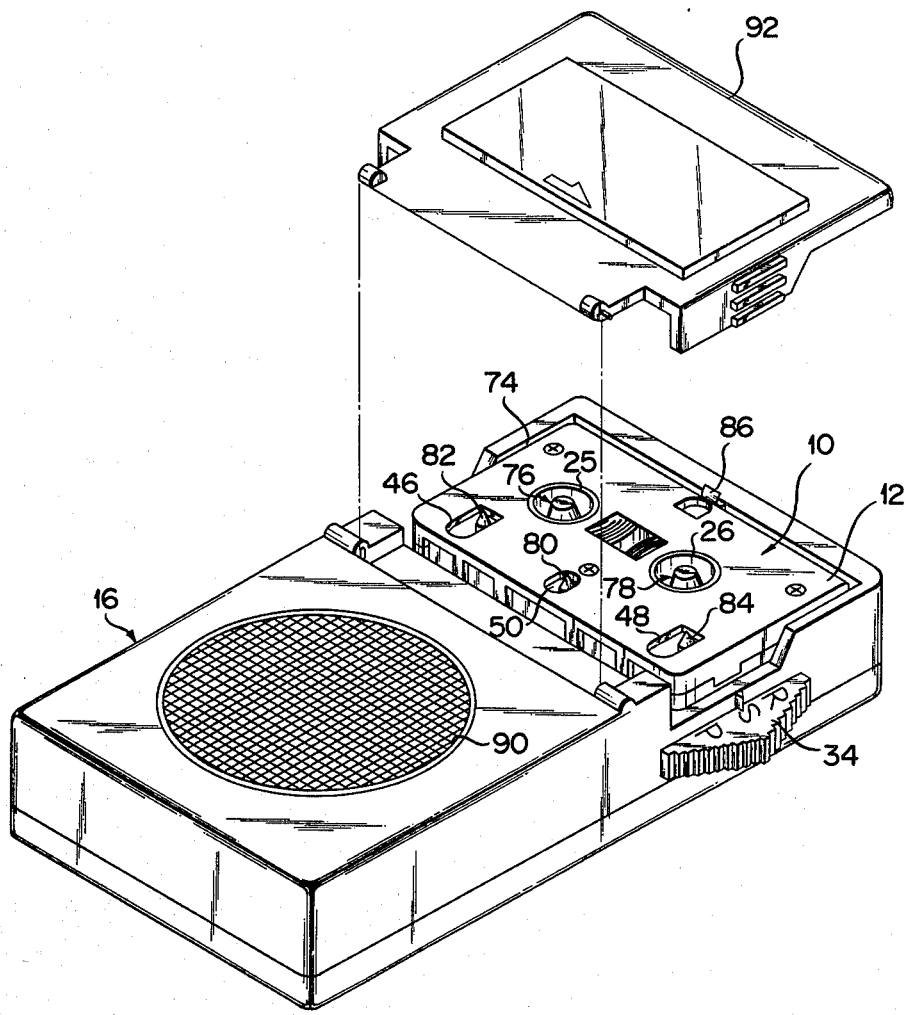
FIG. 6 is a cross-sectional view showing the state in which the tape cassette of FIG. 1 is mounted on the magnetic recording tape running apparatus.

When the tape cassette 10 is mounted in the recess 74 of the apparatus housing, as shown in FIG. 6 the reel shafts 76, 78 are inserted into the reel hubs 25, 26 and the capstan 80 into the fourth elongated hole 50 of the tape cassette. Likewise, the tape cassette position setting pin 82 is inserted into the second elongated hole 46 and the tape cassette position setting pin 84 into the third elongated hole 48. When the tape cassette 10 is mounted in the recess 74 the leaf spring 86 is contacted with the housing 12 of the tape cassette 10 to cause the tape cassette to be pressed forwardly. At this position, the outer surfaces of the pins 82, 84 are contacted with the inner surfaces which define the second and third elongated holes 46, 48 of the housing 12 to permit the tape cassette 10 to be fitted in place in the recess 74 of the apparatus housing 72 as shown in FIG. 6. Arranging the reel shafts 76, 78, the capstan 80, the pins 82, 84 and the leaf spring 86 in the recess 74 of the apparatus housing as shown in the Figures are already known in the magnetic recording tape running apparatus using the tape cassette 10.

In the tape cassette so constructed, even if static electricity occurs on the magnetic recording tape, it can be eliminated from the tape merely by mounting the tape cassette in the magnetic recording tape running apparatus. In this way, an electrostatic charge on the tape is eliminated. That is, the electrostatic charge is transferred to the housing through the electroconductive member in contact with the tape, and then conducted to the outside of the tape cassette 10 by the electroconductive member which is contacted with the housing and is mounted to the apparatus. Where, therefore, the tape is run for recording or reproduction with the tape cassette mounted in the apparatus, even if the electroconductive members of the cassette effect an interrupted contact with the tape with the passage of time, no electrostatic discharge occurs and in consequence there is no chance that such electrostatic charge will be reproduced by the magnetic head as noises.

In this embodiment, as the electroconductive members are contacted with one of the two faces of the tape, the contact area is greater than in the case where they are contacted with the two longitudinal edges of the tape, permitting an insuring flow of the electrostatic charges away from the tape. Further, as the electroconductive members are made of a material the same as that of the housing and formed integral with the housing, the manufacturing and assembling steps can be made easier than in the case where they are formed separately from the housing.

In this embodiment, the electroconductive members are secured to the inner surface of the peripheral wall of the housing and extend from one panel toward the other panel of the housing of the cassette and have the elongated base portions, respectively. As a result, the electroconductive members can be formed strongly and rigidly without requiring any wider space.

In this embodiment, the housing is divided by the above-mentioned mating surfaces into the upper and lower cassette halves and the electroconductive members have their elongated base portions secured to only the inner surface of the peripheral wall of the upper cassette half. The mating surfaces of the upper and lower cassette halves have its first portion located in a range corresponding to the width of the face of the tape, traversing the elongated base portion of the electroconductive member and having a length larger than a width of the elongated base portion of the electroconductive member as measured in a transverse direction to the longitudinal direction of the elongated base portion, and a second portion located nearer to the panel of the upper cassette half than the first portion of the mating surface of the cassette half as viewed in a direction of the width of the tape and not traversing the elongated base portion of the electroconductive member. The panel of the lower cassette half has two guide members arranged one at each side of the electroconductive member as viewed in a transverse direction to the longitudinal direction of the electroconductive member and adapted to contact with the other face of the tape to permit the running tape to be guided. Therefore, the tape can be biased first away from the inner surface of the peripheral wall of the tape cassette by means of the assembling jig, such as the tape shifter and thereafter the upper cassette half can be fitted to the lower cassette half. That is, during the assembly the lower end of the electroconductive member does not press that longitudinal edge of the tape which is located at the side of the panel of the upper cassette half, and thus there is no chance that the tape will be injured by the lower end of the electroconductive member.

In this embodiment the first portion of the mating surface of the cassette half is located in a position corresponding to not more than one-third of the width of the tape as measured from that longitudinal edge of the tape which is located at the side of the panel of the lower cassette half. Therefore, upon assembly, the upper cassette half is moved near the lower cassette half and the tape can be held in a state biased away from the inner surface of the peripheral wall of the tape cassette for a relatively long time after the ridge of the electroconductive member begins to confront the face of the tape. Since, during the assembly, the lower end of the electroconductive member urges the longitudinal edge of the tape, which is located at the side of the panel of the upper cassette half, there is less of a chance that the tape will be injured by the lower end of the electroconductive member.

In this embodiment the housing and electroconductive member of the tape cassette are made of a material formed by powdered or fibrous graphite to polystyrene, they have an electroconductive property. Therefore, they undergo less change in their property with time, than in the case where the housing and electroconductive member of the tape cassette are made of a material formed by adding a powdered or fibrous electroconductive metal to polystyrene.

Although this invention has been explained in connection with the above-mentioned embodiment, it should not be restricted to the above-mentioned embodiment. This invention can be changed or modified in a variety of ways without departing from the spirit and scope of this invention. While in this embodiment the electroconductive members are formed of ridges provided one at each of the inner surfaces of the right and left portions of the peripheral wall 20 of the upper cassette half, this invention is not restricted thereto. A single electroconductive member may be provided on an inner surface of either one of the right and left portions of the peripheral wall 20 of the upper cassette half. The electroconductive member may be replaced by an electroconductive pin which is projected down from the inner surface of the panel of the upper cassette half 54 and adapted to be contacted with a magnetic layer-bearing face of the tape. Such an electroconductive pin may be formed such that it is projected up from the inner surface of the panel of the lower cassette half or down from the inner surface of the peripheral wall of the upper cassette half.

The magnetic recording tape of electroconductive nature is not restricted to an electroconductive recording tape 14 whose magnetic layer is formed by an evaporation process. For example, use may be made of an electromagnetic recording tape whose base is formed of an electroconductive material or an electroconductive recording tape whose magnetic layer is formed of a material made of a magnetic material and paste which has an electroconductive nature. The housing may be made of a material obtained by adding powdered or fibrous carbon to polystyrene, or a material obtained by adding powdered or vibrous carbon to an ABS resin, or a material obtained by adding powdered or fibrous graphite to an ABS resin, or a material obtained by adding a powdered or fibrous metal of an electroconductive nature to a plastics material.

What is claimed is:

1. A tape cassette for mounting in a magnetic recording tape running apparatus having means for receiving a tape cassette housing, at least one element having an electroconductivity and at least one reel shaft for engagement with magnetic recording tape in said housing for causing running of the magnetic recording tape, comprising:
   a magnetic recording tape having an electroconductive nature and being accumulated with electrostatic charges, said tape having two opposite elongated faces;
   a cassette housing made of an electroconductive material and storing therein said magnetic recording tape, and said housing constantly contacting said at least one electroconductive element of the magnetic recording tape running apparatus when said housing is mounted in the receiving means of the magnetic recording tape running apparatus; and
   an electroconductive member made of an electroconductive material and provided in said cassette housing in constant contact with one of said two opposite faces of the magnetic recording tape which extend in a direction of the length and width of the tape to transfer electrostatic charges from the magnetic recording tape to said cassette housing, and then to said at least one electroconductive element of the magnetic recording tape running apparatus which is in constant contact with said cassette housing.

2. The tape cassette of claim 1, in which said electroconductive member is formed integrally with said housing of the same material as that of said housing.

3. The tape cassette of claim 2, wherein:
   said housing comprises two panels having mutually confronting inner surfaces and respectively at least one reel shaft insertion hole for the at least one reel shaft of the magnetic recording tape running apparatus; and a peripheral wall secured to said two panels along the edges thereof and having an inner surface confronting one of said two opposite faces of the magnetic recording tape; and
   said electroconductive member comprises an elongated base portion secured to the inner surface of said peripheral wall and having its longitudinal direction line located in a direction traversing the inner surfaces of said two panels and extending from one of said two panels toward the other of said two panels.

4. The tape cassette of claim 3, wherein:
   said peripheral wall has two portions having respectively two mating surfaces mating with each other;
   said housing is divided by said two peripheral wall portions into first and second cassette halves each including a respective one of said two panels;
   said elongated base portion of said electroconductive member is secured only to the inner surface of the peripheral wall portion of the first cassette half;
   the mating surfaces of the first and second cassette halves have a first portion located within a range corresponding to the width of a face of the magnetic recording tape, traversing the elongated base portion of the electroconductive member and having a length greater than a width of the elongated base portion as measured in a direction perpendicular to the longitudinal direction of the elongated base portion, and a second portion located closer to the panel of the first cassette half than the first portion as viewed in a direction of the width of the magnetic recording tape and not traversing the elongated base portion of the electroconductive member; and said panel of the second cassette half comprises two guide members arranged one at each side of said electroconductive member as viewed in a direction perpendicular to the longitudinal direction of the elongated base portion of said electroconductive member for contacting with the other face of the magnetic recording tape and guiding the running of the magnetic recording tape.

5. The tape cassette of claim 4, wherein said first portion of said mating surfaces is located in a position corresponding to not more than one-third of the width of the magnetic recording tape which is located on the panel of said second cassette half.

6. The cassette tape of any one of claims 1, 2, 3, 4 or 5, wherein said housing comprises an ABS resin having at least one of powdered and fibrous carbon therein.

7. The cassette tape of any one of claims 1, 2, 3, 4 or 5, wherein said housing comprises an ABS resin having at least one of powdered and fibrous graphite therein.

8. The cassette tape of any one of claims 1, 2, 3, 4 or 5, wherein said housing comprises a polystyrene having at least one of powdered and fibrous carbon therein.

9. The cassette tape of any one of claims 1, 2, 3, 4 or 5, wherein said housing comprises a polystyrene having at least one of powdered and fibrous graphite therein.

* * * * *

UNITED STATES PATENT AND TRADEMARK OFFICE
CERTIFICATE OF CORRECTION

PATENT NO. : 4,345,284

DATED : August 17, 1982

INVENTOR(S) : Shoichi SAITO

It is certified that error appears in the above-identified patent and that said Letters Patent is hereby corrected as shown below:

COLUMN 10 (claim 5), line 6, after "magnetic recording tape"

insert --as measured from the longitudinal edge of the magnetic recording tape--.

Signed and Sealed this

Fourteenth Day of December 1982

[SEAL]

Attest:

Attesting Officer

GERALD J. MOSSINGHOFF

Commissioner of Patents and Trademarks